US008121120B2

(12) United States Patent  
Kodaka et al.

(10) Patent No.: US 8,121,120 B2  
(45) Date of Patent: Feb. 21, 2012

(54) PACKET RELAY APPARATUS

(75) Inventors: Hideo Kodaka, Ebina (JP); Ken Sunata, Chigasaki (JP); Hideki Hinosugi, Tokyo (JP)

(73) Assignee: Alaxala Networks Corporation, Kanagawa (JP)

( * ) Notice: Subject to any disclaimer, the term of this patent is extended or adjusted under 35 U.S.C. 154(b) by 100 days.

(21) Appl. No.: 12/483,739

(22) Filed: Jun. 12, 2009

(65) Prior Publication Data

US 2009/0316714 A1 Dec. 24, 2009

(30) Foreign Application Priority Data

Jun. 20, 2008 (JP) ................................. 2008-161128

(51) Int. Cl.  
*H04L 12/28* (2006.01)  
*H04L 12/56* (2006.01)

(52) U.S. Cl. .................... 370/389; 370/412; 709/231

(58) Field of Classification Search .................. None  
See application file for complete search history.

(56) References Cited

U.S. PATENT DOCUMENTS

| | | | | |
|---|---|---|---|---|
| 6,804,234 B1* | 10/2004 | Chow | ........................... | 370/389 |
| 6,912,225 B1* | 6/2005 | Kohzuki et al. | ............... | 370/412 |
| 7,188,190 B1* | 3/2007 | Kojima et al. | ................ | 709/239 |
| 2005/0213504 A1* | 9/2005 | Enomoto et al. | .............. | 370/235 |
| 2008/0089233 A1* | 4/2008 | Shimojo et al. | ............... | 370/236 |

FOREIGN PATENT DOCUMENTS

| | | |
|---|---|---|
| JP | 2004-363681 A | 12/2004 |
| JP | 2006-339790 A | 12/2006 |
| WO | 2005/079016 A1 | 8/2005 |
| WO | 2006/082578 A1 | 8/2006 |

OTHER PUBLICATIONS

AX7800R/AX7700R Software Manual, Applications Guide, vol. 2, Ver. 10.2 compatible, ALAXALA Networks Corporation, Jun. 2006, pp. 36-44.

* cited by examiner

*Primary Examiner* — Chirag Shah  
*Assistant Examiner* — Minh-Trang Nguyen  
(74) *Attorney, Agent, or Firm* — Mattingly & Malur, PC

(57) ABSTRACT

In a packet relay apparatus equipped with a hierarchical bandwidth control function, a queuing unit of a bandwidth controller for controlling a bandwidth of a packet to be transmitted recognizes user information for identifying a user from VLAN ID of a received Tag-VLAN packet, acquires queue information representative of a queue position by referring to a priority mapping table by using a user priority order in the packet, and queues the packet to the queue identified by the user information and queue information. Bandwidth control can therefore be performed without searching a QoS information management table.

6 Claims, 14 Drawing Sheets

FIG. 3

| DEFAULT USER INFORMATION | DEFAULT QUEUE INFORMATION |
|---|---|
| DEFAULT USER | 1 |

| PRIORITY ORDER INFORMATION | QUEUE INFORMATION |
|---|---|
| 1 | 1 |
| 2 | 2 |
| 3 | 3 |
| 4 | 4 |
| 5 | 5 |
| 6 | 6 |
| 7 | 7 |
| 8 | 8 |

430, 431, 432

FIG. 9
| | PACKET DETECTION CONDITION | USER INFORMATION | QUEUE INFORMATION |
|---|---|---|---|
| | | 3162 | 3163 |
| 3161 | TRANSMISSION SOURCE MAC ADDRESS = A USER PRIORITY ORDER = 1 | USER 1 | 1 |
| | TRANSMISSION SOURCE MAC ADDRESS = A USER PRIORITY ORDER = 2 | USER 1 | 2 |
| | ⋮ | ⋮ | ⋮ |
3160
QoS INFORMATION (columns 3162, 3163)
FIG. 10
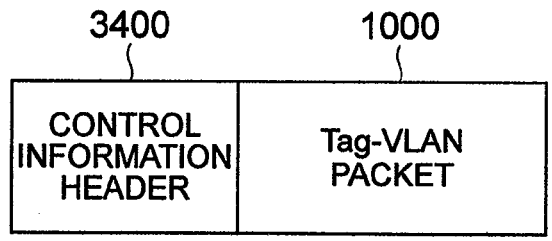
| 3400 | 1000 |
|---|---|
| CONTROL INFORMATION HEADER | Tag-VLAN PACKET |
FIG. 11
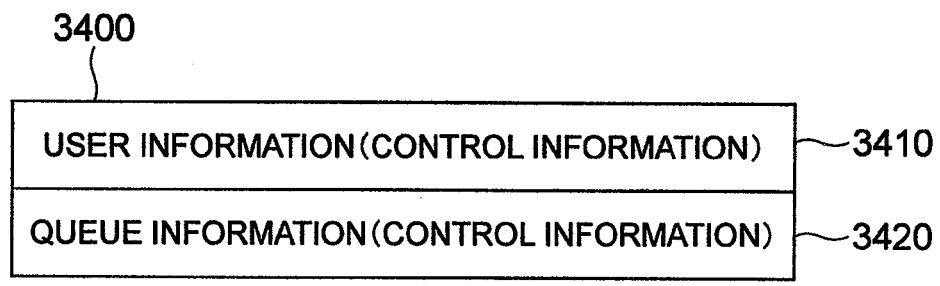
3400
| USER INFORMATION (CONTROL INFORMATION) | 3410 |
| QUEUE INFORMATION (CONTROL INFORMATION) | 3420 |

| | | QoS INFORMATION | | | |
|---|---|---|---|---|---|
| 4100 | 4110 | 4120 | 4130 | 4140 | 4150 |
| PACKET DETECTION CONDITION | USER INFORMATION REFERENCE MODE | QUEUE INFORMATION REFERENCE MODE | USER INFORMATION | QUEUE INFORMATION | |
| TRANSMISSION SOURCE MAC ADDRESS = A USER PRIORITY ORDER = 1 | HEADER REFERENCE | — | USER 1 | 1 | |
| TRANSMISSION SOURCE MAC ADDRESS = A USER PRIORITY ORDER = 2 | HEADER REFERENCE | HEADER REFERENCE | USER 1 | 2 | |
| ⋮ | ⋮ | ⋮ | ⋮ | ⋮ | |

| | PACKET TYPE | USER INFORMATION | PRIORITY ORDER INFORMATION |
|---|---|---|---|
| 3540 | IPv4 | DESTINATION IP ADDRESS | TOS |
| 3550 | IPv6 | DESTINATION IPv6 ADDRESS | TRAFFIC CLASS |
| 3560 | IPv6 | FLOW LABEL | TRAFFIC CLASS |
| 3570 | MPLS | LABEL | Exp |

FIG. 19

| SCENARIO NAME | SCENARIO A | SCENARIO B | ... |
|---|---|---|---|
| MINIMUM BANDWIDTH | 1Mbps | 10Mbps | ... |
| MAXIMUM BANDWIDTH | 100Mbps | 50Mbps | ... |
| SCHEDULING METHOD | PQ | PQ | ... |
| ... | ... | ... | ... |

5100  5110  5120  5130 shaper auto-configuration  < SCENARIO NAME >  < USER COUNT >

FIG. 21

5200  5210  5220  5230  5240 shaper auto-configuration  < SCENARIO NAME >  < USER COUNT >  < SPECIAL USER COUNT >

5300  5310  5320  5330 shaper user  SPECIAL USER 1  SETTING INFORMATION

...

PACKET RELAY APPARATUS

INCORPORATION BY REFERENCE

The present application claims priority from Japanese application JP 2008-161128 filed on Jun. 20, 2008, the content of which is hereby incorporated by reference into this application.

BACKGROUND OF THE INVENTION

The present invention relates to techniques of identifying a packet and determining a priority order, and to bandwidth control techniques of controlling a bandwidth by queuing a packet in accordance with its priority order, respectively for a packet relay apparatus for relaying a packet in a network. The present invention relates also to techniques of setting priority control information and bandwidth control information for a packet relay apparatus.

A Wide Area Ethernet (registered trademark) network is widely prevailing nowadays, expanding the techniques of Ethernet (registered trademark) used for a local area network (LAN) to a wide area network (WAN). The Tag-VLAN techniques IEEE802.1Q of multiplexing a plurality of virtual LAN's on Ethernet (registered trademark) allow to process each Tag-VLAN as a single user so that a number of users can be accommodated inexpensively and easily.

A quality of service (QoS) control function is known as techniques of preferentially relaying a packet of a particular user in a Wide Area Ethernet (registered trademark) network and controlling a bandwidth. The QoS control function is provided in a packet relay apparatus for relaying a packet, and mainly includes a QoS search unit for identifying a packet and determining a priority order, and a bandwidth control unit for controlling a bandwidth by queuing a packet in accordance with its priority order.

For example, JP-A-2004-363681 describes a method of realizing a QoS control function. With this method, a QoS search unit compares a header of a received packet with the conditions in a search table, and if coincident, the packet is queued in a designated queue. It is necessary to set beforehand conditions to the search table. This method is characterized particularly in that a queuing destination is decided by performing QoS search without restructuring fragment packets divided from one packet to recover the original.

The bandwidth control unit has a hierarchical shaper function described in "AX7800R/AX7700R Software Manual Applications Guide, Vol. 2 Ver. 10.2 compatible" ALAXALA Networks Corporation, June 2006, pp. 36-44. With this hierarchical shaper function described in this Guide, for example, in a network configuration multiplexing VLAN's on one physical port by utilizing a Tag-VLAN function, it is possible to control a bandwidth of each VLAN and control a priority in accordance with user priority order information in a Tag-VLAN header. A minimum bandwidth value, a maximum bandwidth value, a weighting value to be used when a surplus bandwidth is distributed, and the like are set for each VLAN. When the hierarchical shaper function is used, the priority order decision function of the QoS search unit decides aggregate queue information (also called user information) and queue information corresponding to each VLAN to designate a queuing destination of a packet. As this function is applied to downstream traffic of an edge apparatus in a Wide Area Ethernet (registered trademark) network, a minimum bandwidth is ensured for each user even if traffic congestion occurs.

An example requiring the hierarchical shaper function will be described. For example, this function is required if a network to which 500 users belong and a packet relay apparatus are connected by a line of 1 Gbit/s and it is desired to ensure a minimum bandwidth of 1 Mbit/s per user under a line bandwidth contract of 500 Mbit/s. By using the hierarchical shaper function, bandwidth control of two stages can be performed, i.e., the minimum bandwidth of each user is controlled to be 1 Mbit/s while the line is restricted to the contract bandwidth. There are requests to aggregate a plurality of business places into one line by utilizing bandwidth control of three stages such as lines—business places—users in a future network configuration. It is anticipated that the number of hierarchical layers to be subjected to bandwidth control will increase.

SUMMARY OF THE INVENTION

The hierarchical shaper function is generally used by aggregating a plurality of users into one line, and there is a tendency that the number of users accommodated by one port increases in order to reduce a price per port of a packet relay apparatus. As the number of users per port increases, the number of entries of a QoS information management table increases, which table is used when services of each user are identified to decide a priority order. With the method described in JP-A-2004-363681, as the number of users increases, there arises an issue that the number of entries becomes insufficient because of the limited number of entries of the QoS information management table.

Further, as the number of users increases, the number of commands for registering an entry in the QoS information management table increases. Furthermore, the hierarchical shaper function described in the cited Guide is associated with an issue of an increased number of commands in the bandwidth control unit for setting bandwidth control information such as a minimum bandwidth value, a maximum bandwidth value, a weighting value to be used when a surplus bandwidth is distributed, and the like.

In order to be compatible with a future network configuration, there arises another issue that a queuing unit can be used even if the number of hierarchical levels under bandwidth control increases.

In order to settle at least one of these issues, the present invention provides a packet relay apparatus equipped with a bandwidth controller wherein a queuing unit equipped in the bandwidth controller acquires user information for identifying a user and priority order information from a predetermined field in a received packet, and identifies a queue for storing the packet, in accordance with the user information and priority order information.

Since a storage destination of a packet is determined based upon header information of the packet, it is possible to suppress the number of entries used of a QoS information management table possessed by a packet processing unit or even to omit entries.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram illustrating an example of the structure of a default user table.

FIG. 4 is a diagram illustrating an example of the structure of a priority order mapping table.

FIG. 9 is a diagram illustrating an example of the structure of a QoS information management table.

FIG. 10 is a diagram illustrating the format of a Tag-VLAN packet affixed with a control information header.

FIG. 11 is a diagram illustrating the detailed format of the control information header.

FIG. 19 is a diagram illustrating examples of bandwidth information scenarios of a hierarchical shaper function.

FIG. 20 is a diagram illustrating an example of a setting command of the hierarchical shaper function.

FIG. 21 is a diagram illustrating examples of the setting command of the hierarchical shaper function.

DESCRIPTION OF THE EMBODIMENTS

Embodiments of the present invention will now be described with reference to the accompanying drawings.

Figure 1:
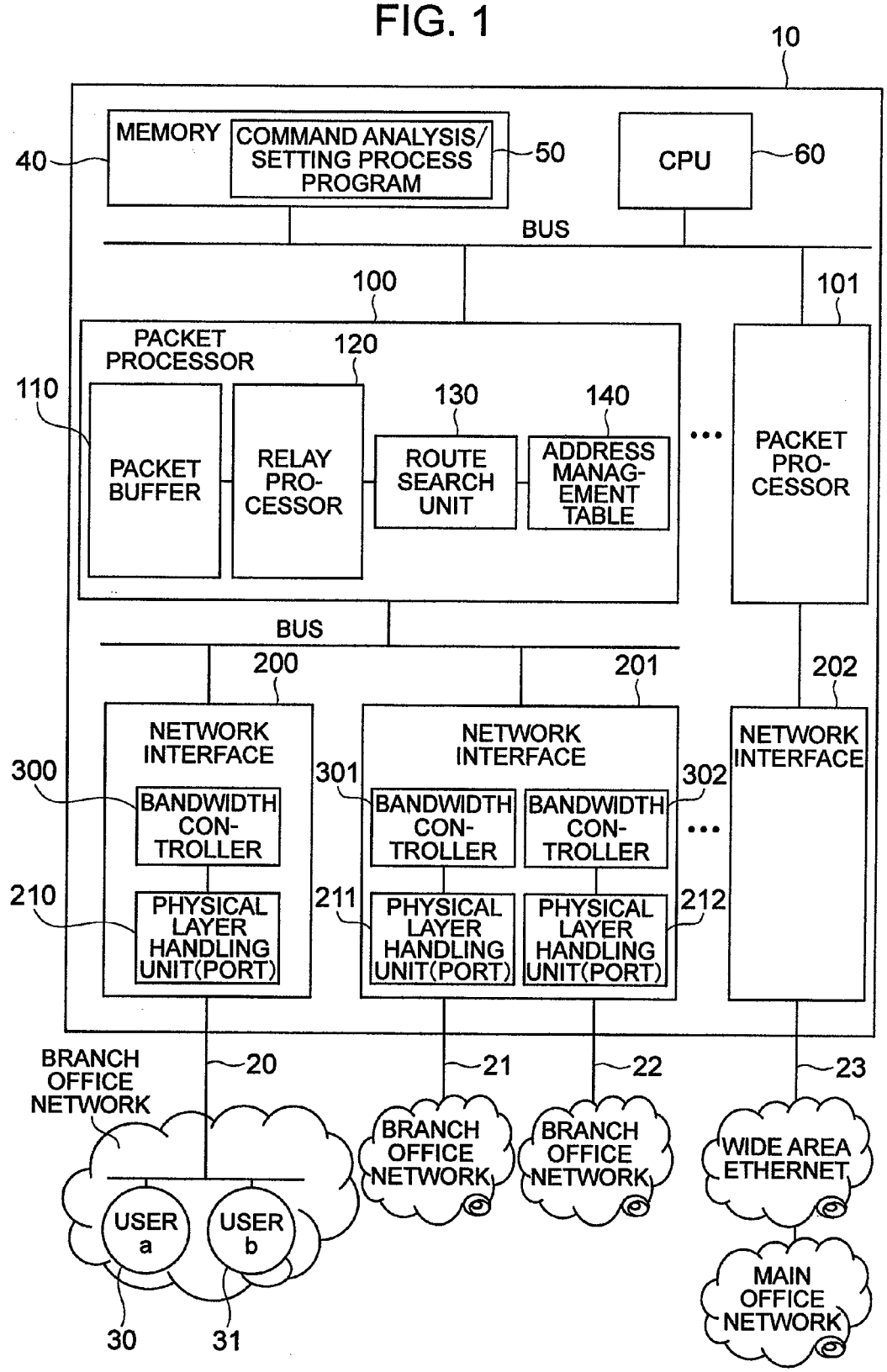
FIG. 1 is a diagram illustrating examples of the internal structure of a packet relay apparatus and a network configuration.

FIG. 1 illustrates the internal structure of a packet relay apparatus according to an embodiment of the present invention and an example of the configuration of networks using the packet relay apparatus. The networks of the embodiment have the configuration that a packet relay apparatus 10 implementing the present invention connects branch office networks 20 to 22 and a Wide Area Ethernet (registered trademark) network 23. Users 30, 31 in the branch office network communicate with users or servers of other branch office networks or a main office network. The users in each branch office network are multiplexed on a line by using Tag-VLAN's.

Figure 5:
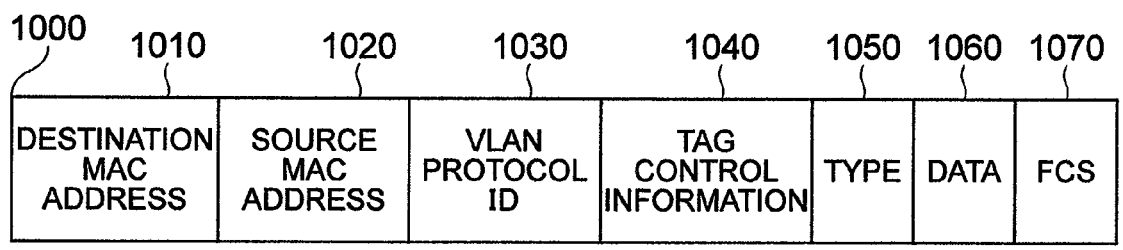
FIG. 5 is a diagram illustrating the format of a Tag-VLAN packet.

FIG. 5 illustrates the format of a Tag-VLAN packet of Ethernet (registered trademark). A Tag-VLAN packet 1000 is constituted of: a destination MAC address 1010; a source MAC address 1020; a VLAN protocol ID 1030 representative of a protocol number of VLAN; tag control information 1040 to be described later with reference to FIG. 6; a type 1050 representative of a protocol type of an upper level layer; a data field 1060 for storing data of Ethernet (registered trademark); and an FCS 1070 for judging whether data was broken.

Figure 6:
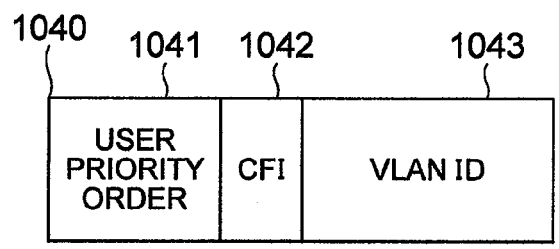
FIG. 6 is a diagram illustrating the detailed format of tag control information.

FIG. 6 illustrates the details of the tag control information 1040. The tag control information is constituted of a user priority order 1041 representative of a priority order of a Tag-VLAN packet, a CFI 1042 representative of a bit order formation of a MAC address, and a VLAN ID 1043 for identifying VLAN.

The embodiment will now be described by taking as an example the case of a Tag-VLAN packet, i.e., the case where the packet type is Tag-VLAN.

In this embodiment, the packet relay apparatus 10 has the structure including network interfaces 200 to 202 for connecting networks 20 to 23 and executing transmission/reception of a packet relative to the networks, packet processors 100 to 101 for connecting the network interfaces and determining packet relay destinations in accordance with header information of packets to be transmitted and received, a memory 40 for storing software programs and the like to control the apparatus, and a CPU 60 for executing the software programs in the memory, respectively interconnected by buses. For example, as a user a 30 transmits a packet to the same user a in the branch office network 22, the network interface 200 transfers the received packet to the packet processor 100. The packet processor 100 determines a relay destination from the header information, and transfers the packet to the network interface 201 having a port from which the packet is to be transmitted. The network interface 201 executes bandwidth control for the user a and transmits the packet to the network 22.

The memory 40 stores therein a command analysis/setting process program 50 and the like, the program being used for analyzing a command for setting a hierarchical shaper function and an input command, and setting the contents of each command to hardware.

Each of the packet processors 100 to 101 is constituted of: a packet buffer 110 for storing a received Tag-VLAN packet; an address management table 140 for managing a correspondence between a destination MAC address and an output destination port number; a route search unit 130 for searching the address management table 140 in accordance with the header information of the received packet; and a relay processor 120 for storing the received packet in the packet buffer 110, outputting a search command to the route search unit 130 in accordance with the header information extracted from the packet, and transmitting the packet to the port corresponding to the search result.

The network interfaces 200 and 202 are constituted of bandwidth controllers 300 to 302 for bandwidth control of a received packet and physical layer handling units 210 to 212 for transmitting/receiving a packet to/from a physical line.

Figure 2:
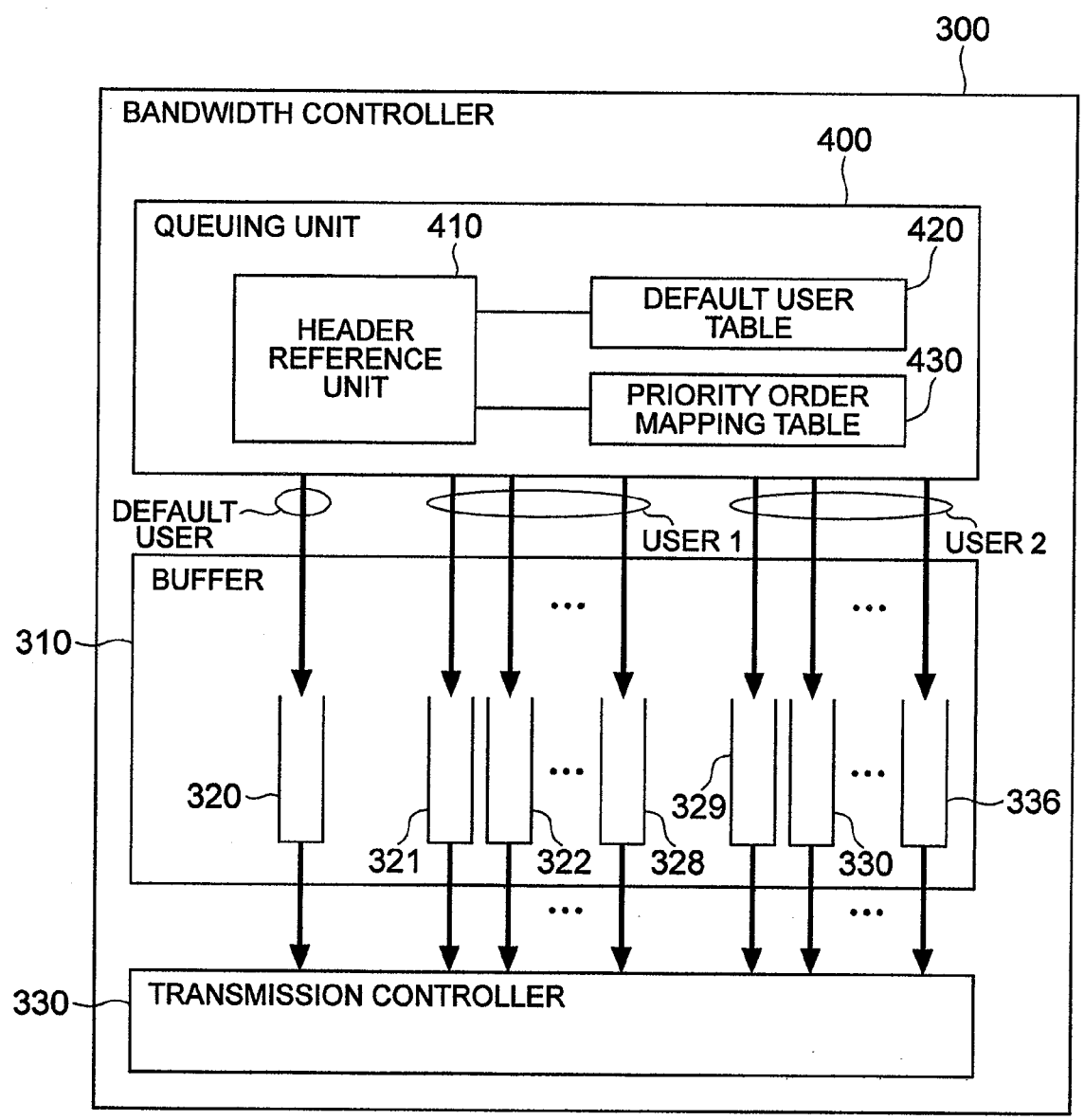
FIG. 2 is a diagram illustrating an example of the internal structure of a bandwidth controller.

FIG. 2 illustrates the details of the bandwidth controller 300 characteristic to the present invention. A bandwidth controller 300 is constituted of a queuing unit 400 to be described later, a buffer 310 for holding queues 320 to 336 each for storing a packet, and a transmission controller 330 for transmitting a packet from the queues 320 to 336 in accordance with a set bandwidth. The buffer 310 is equipped with a queue 320 for a default user, eight queues 321 to 328 for a user 1, and eight queues 329 to 336 for a user 2.

The queuing unit 400 is constituted of a header reference unit 410, a default user table 420, and a priority order mapping table 430. The header reference unit 410 determines a queuing destination of a received packet, in accordance with information on the VLAN protocol ID 1030 of the Tag-VLAN packet 1000, the user priority order 1041 and the VLAN ID 1043. The default user table 420 manages queuing information of a packet other than the Tag-VLAN packet. The priority mapping table 430 manages a correspondence between priority order information and queue information in a Tag-VLAN packet. The default user table 420 holds default user information 421 and default queue information 422, as illustrated in FIG. 3. The priority order mapping table 430 holds priority order information 431 and queue information 432 to be referred to the priority order information, as illustrated in FIG. 4. "1 to 8" held in the queue information 432 indicate a relative position of each queue provided for each user. For example, for the user 1, the queues 321 to 328 correspond to the queue information "1 to 8". Therefore, a packet of the user 1 is stored in the queue 321 corresponding to the queue information "1" if the priority order information is "1". This is applied also to the default user and user 2. A correspondence between priority order information and queue information can be changed flexibly by the settings of this table.

Figure 7:
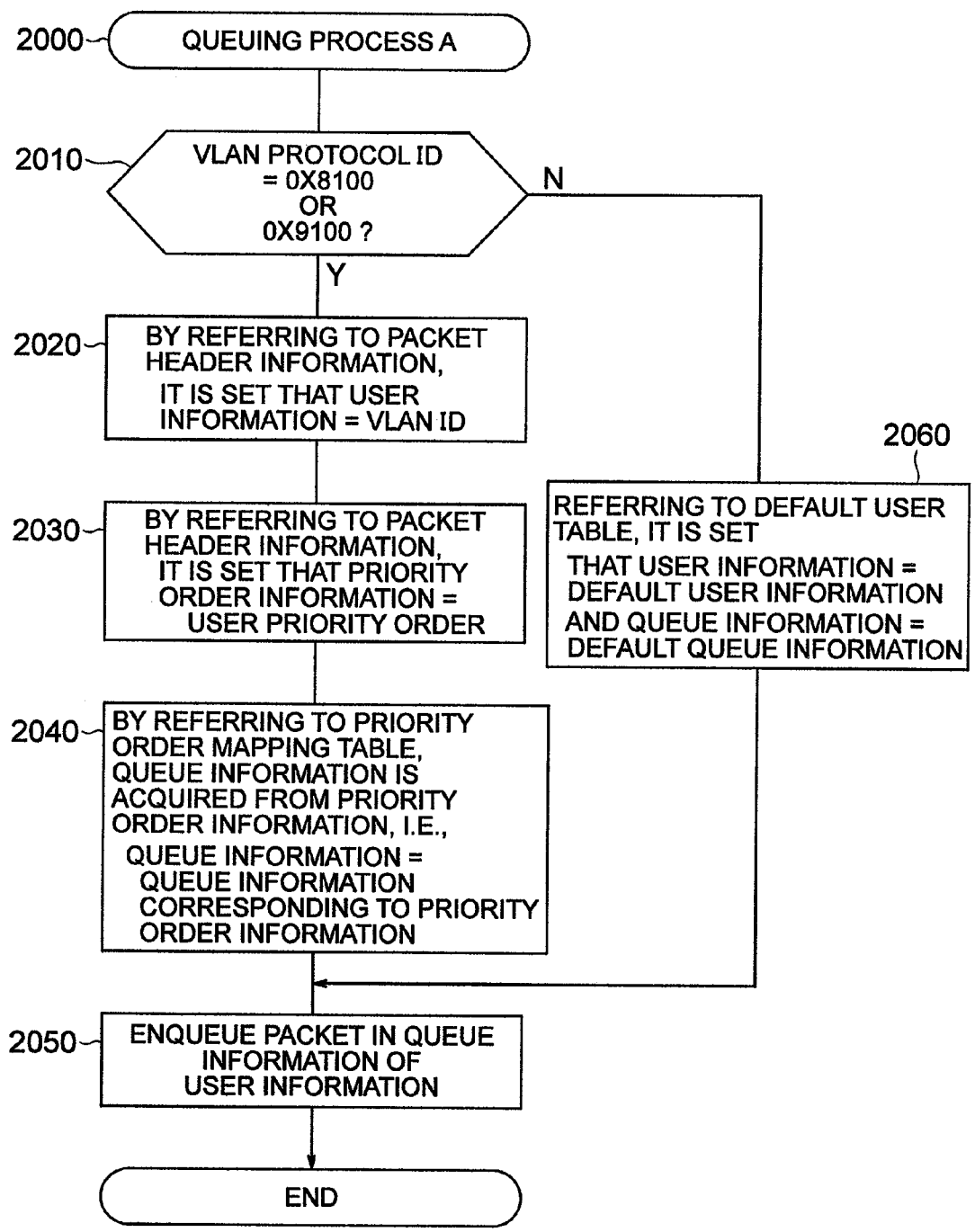
FIG. 7 is a flow chart illustrating a queuing process A by a header reference unit.

Next, by using the flow chart of FIG. 7, description will be made on an example of an operation of the header reference unit 410.

The header reference unit 410 judges whether the VLAN protocol ID 1030 of a received Tag-VLAN packet 1000 is coincident with 0x8100 or 0x9100 representative of a Tag-VLAN packet (Step 2010). If coincident, by referring to the packet header information, a VLAN ID 1043 is used as the user information (Step 2020), and a user priority order 1041 is used as the priority order information (Step 2030). By using the priority order information as a search key, the priority order mapping table 430 is searched to acquire the queue information 432 corresponding to the priority order information 431 (Step 2040). The packet is queued in a queue identified by the acquired user information and queue information (Step 2050).

More specifically, it is assumed for example that "0x8100" is stored in the VLAN protocol ID of a received Tag-VLAN packet 1000, information representative of "user 1" (e.g., simply "1") is stored in the VLAN ID 1043, and "2" is stored in the user priority order 1041. In this case, since the packet is judged as a Tag-VLAN packet at Step 2010, it is set that user information="user 1" (or simply "1") and priority order information="2" (Steps 2020 and 2030). At Step 2040, queue information "2" corresponding to the priority order information "2" is acquired at Step 2040. At Step 2050 a queue 322 corresponding to the queue information "2" is selected from the queues 321 to 328 prepared for the user information "user 1", and the packet is stored (queued) in the queue 322.

If it is not judged as coincident at Step 2010, by referring to the default user table 420, the default user information 421 is used as the user information and the default queue information 422 is used as the queue information (Step 2060) to thereafter execute Step 2050. In this case, since the default user table 420 is referred to, user information="default user" and default queue information="1" (Step 2060). At Step 2050, a queue 320 corresponding to the default queue information "1" is selected from the queue 320 prepared for the user information "default user", and the packet is stored (queued) in the queue 320.

In this embodiment, a value itself stored in the user priority order 1041 in the packet header is used as the priority order information, and a value itself stored in the VLAN ID 1043 is used as the user information. Therefore, a queuing destination can be determined only by referring to the header information of a received packet. It is not necessary to determine a queuing destination of a packet by providing a QoS information management table and searching the table as in prior art. It is therefore unnecessary to provide the QoS information management table and set an entry to the QoS information management table. It is therefore possible to settle the issue that the number of entries becomes insufficient. Further, since the packet processor is not required to search the QoS information management table, a load on the packet processor can be reduced. Furthermore, since the QoS information management table itself with a large number of entries is not required, a memory capacity can be reduced and a packet relay apparatus capable of high speed queuing can be provided inexpensively.

In this embodiment, although the user priority order 1041 and VLAN ID 1043 in the packet header are adopted in order to determine the priority order information and user information, another field of the packet may be used to determine the priority order information and user information. This embodiment is particularly useful when the priority order information and user information is determined by one field in the packet.

Next, the command analysis/setting process program 50 will be described.

FIG. 20 illustrates an input format of a setting command for the hierarchical shaper function, in the command analysis/setting process program 50. The setting command is constituted of: a command name "shaper" 5100 for the hierarchical shaper function; a sub-command name "auto-configuration" 5110; a parameter "<scenario name>" 5120 for selecting a scenario of bandwidth control information to be described later; and a parameter "<user count>" 5130 for determining the number of users per port. As illustrated in FIG. 19, the scenario of bandwidth control information is constituted of a minimum bandwidth 5040 and a maximum bandwidth 5050 for determining bandwidth control, a scheduling method 5060 for determining a packet output order, and the like. Scenarios 5010 to 5030 with these combinations are provided.

For example, in a scenario A 5010, a maximum bandwidth 5050 of each user is set to 100 Mbps same as the line bandwidth, and a minimum bandwidth 5040 of each user is set to 1 Mbps obtained by equally dividing the line bandwidth by the input parameter user count 5130 (assuming 100 users). PQ (Priority Queuing) is set as the scheduling method 5060. In accordance with the selected scenario, bandwidth information of the hierarchical shaper function is set to the transmission controllers 330 of all the bandwidth controllers 300 to 302. In accordance with the set bandwidth information (minimum and maximum bandwidths of each user and the scheduling method), the bandwidth controller 330 reads a packet from each queue in the buffer 310 and sends the packet to the network to realize bandwidth control of two stages ensuring bandwidths of each user and a line. Description will be made on a bandwidth control operation, for example, when two users 1 and 2 input traffics of 100 Mbps. First, each user ensures a minimum bandwidth of 1 Mbps. Next, the total sum of the minimum bandwidths of 2 Mbps is subtracted from the line bandwidth of 100 Mbps to obtain 98 Mbps which is equally divided by two users input the traffics. Each user is therefore further supplied with a bandwidth of 49 Mbps. A bandwidth ultimately distributed to each of the users 1 and 2 is 1+49=50 Mbps. The transmission controller reads a packet from each queue by preserving the bandwidth distributed to each user. While the minimum bandwidth of each user and the line bandwidth are preserved, a bandwidth not used in the line, if any, is efficiently utilized in the range of the maximum bandwidth. This is the characteristic features of bandwidth control of two stages. Although the minimum bandwidth 5040 of each user is set to a value obtained by equally dividing the line bandwidth by the input number of users, this minimum bandwidth may be a predetermined value.

Figure 22:
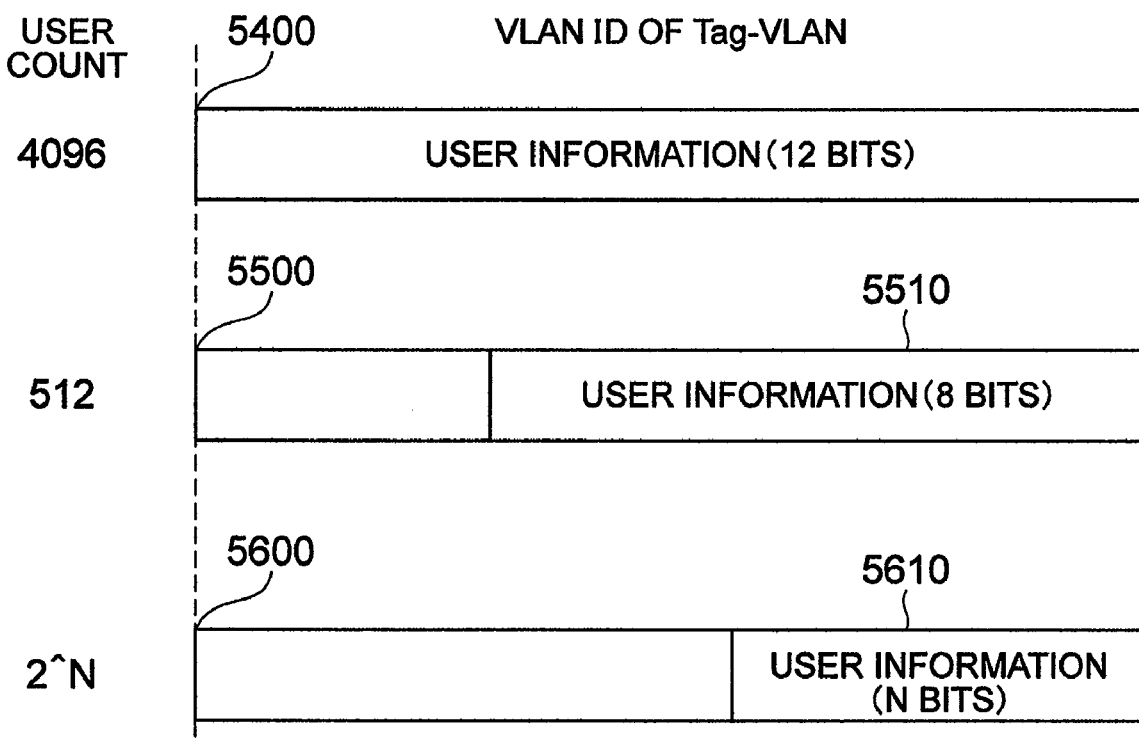
FIG. 22 is a diagram illustrating a relation between the number of users and a bit range of user information.

In accordance with the input number of users, a subject field of user information (VLAN ID) of the packet header information may be changed. For example, as shown in FIG. 22, if the number of users is power of 2, e.g., 512 per port, then the subject field is lower 8 bits, facilitating implementation to hardware.

According to the embodiment, by inputting one command, a predetermined scenario can be selected and one bandwidth control scheme can be applied to all users. It is not necessary to set bandwidth control information for each user as in prior art. The issue that the number of commands increases can be settled, and a command input setting time can be shortened.

Figure 8:
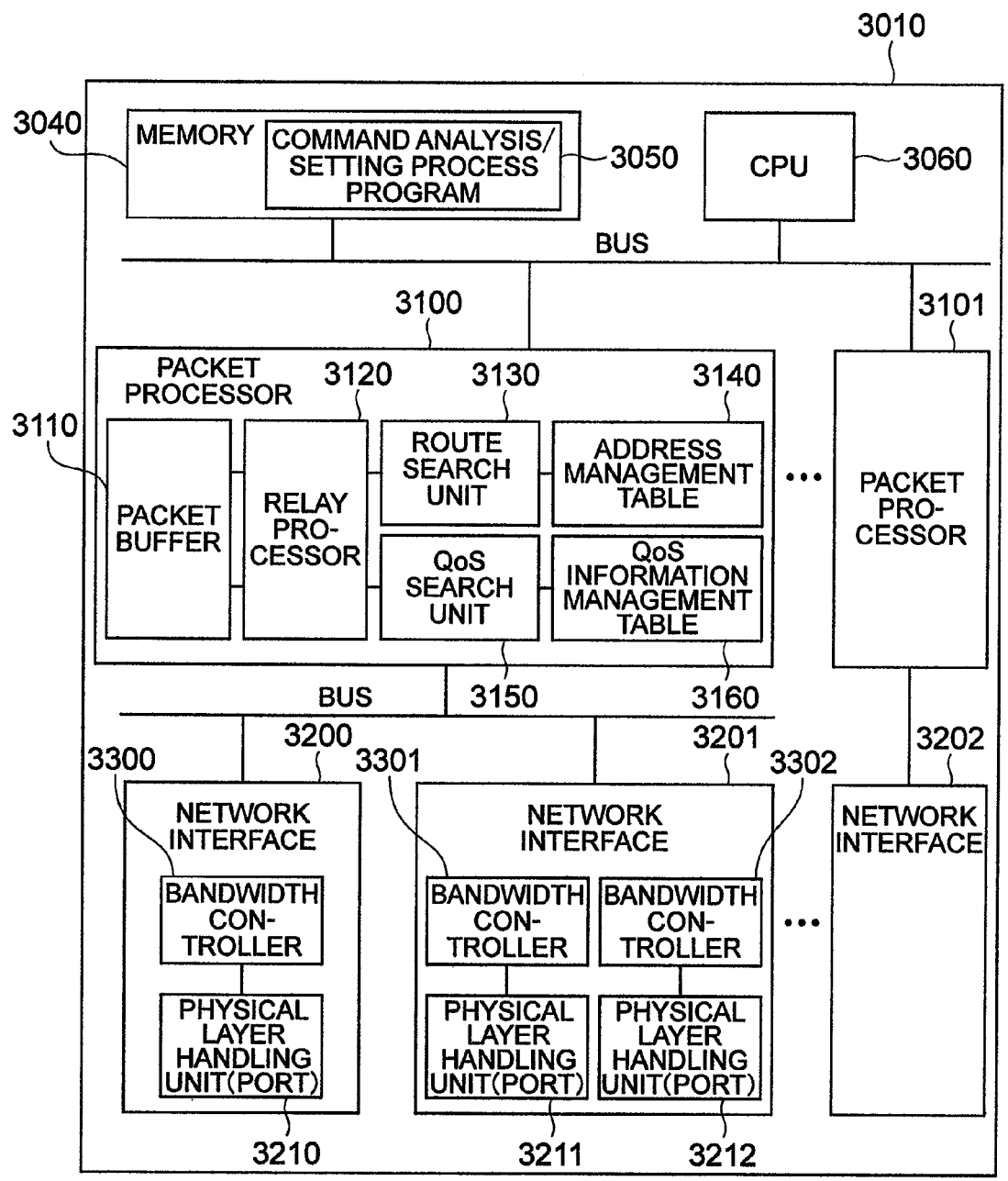
FIG. 8 is a diagram illustrating another example of the structure of a packet relay apparatus.

FIG. 8 illustrates another example of the structure of a packet relay apparatus 3010 according to an embodiment. The packet relay apparatus 3010 is different from the packet relay apparatus 10 described with reference to FIG. 1 in that a packet processor unit 3100 has a QoS information management table 3160 for storing a packet detection condition and QoS information including user information and queue information of a detected packet, and a QoS search unit 3150 for searching the QoS information management table 3160 by using header information of a received packet as a search key, to acquire QoS information. A relay processor 3120 stores a packet received from a corresponding one of network interfaces 3200 to 3202, in a packet buffer 3110, sends a search command to a route search unit 3130 and the QoS search unit 3150, in accordance with the header information extracted from the packet, and transmits the packet to a port corresponding to the search result. Although the details will be described with reference to FIG. 12, bandwidth controllers 3300 to 3302 of the network interfaces 3200 to 3202 are provided further with a QoS reference mode of determining which of the search result by the QoS search unit 3105 and the packet header information is referred to as QoS information.

FIG. 9 illustrates an example of the QoS information management table 3160 to be searched by the QoS search unit 3150. This table is constituted of a packet detection condition 3161 and QoS information. The packet detection condition is determined from packet header information such as a destination MAC address, a source MAC address, a VLAN number, and a user priority order. The QoS information indicates that the packet coincident width the packet detection condition is queued in the queue identified by which user information 3162 and queue information 3163.

The QoS information is transmitted between the packet processors 3100 to 3101 and the network interfaces 3200 to 3202, by affixing a control information header 3400 illustrated in FIG. 10 to the head of a packet. As illustrated in FIG. 11, user information (control information) 3410 and queue information (control information) 3420 as the search result by the QoS search unit 3150 is written in the control information header 3400. Namely, in the packet processors 3100 to 3101, the route search unit 3130 searches a port to which a received packet is output, and the QoS search unit 3150 searches the QoS information. When the packet is transmitted to any one of the network interfaces 3200 to 3202 having a port to which the packet is transmitted, the control information header 3400 is added to the head of the packet, and the QoS information (user information and queue information) searched by the QoS search unit 3150 is stored in the control information header.

Figure 12:
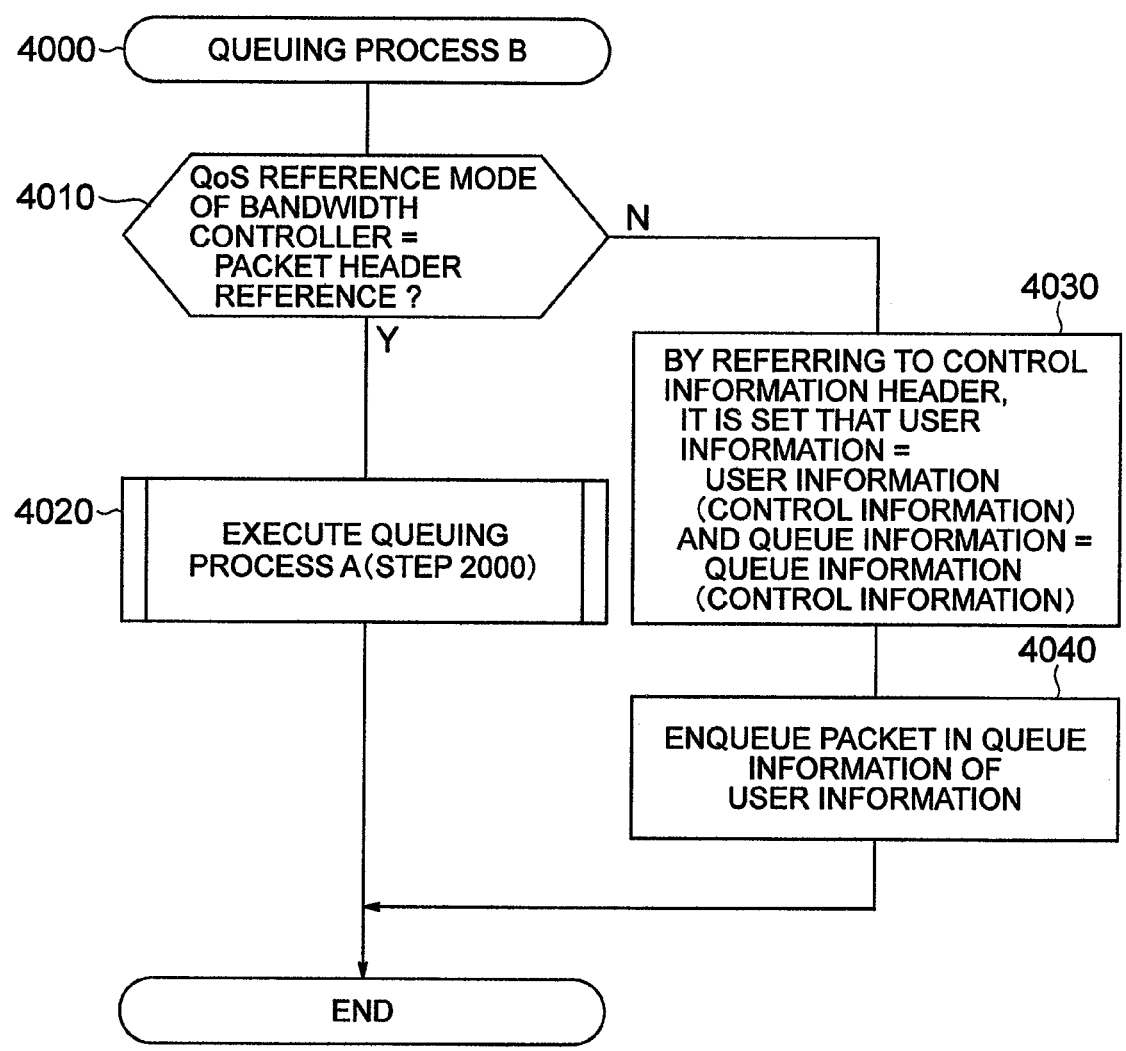
FIG. 12 is a flow chart illustrating a queuing process B by the header reference unit.

FIG. 12 is an example of a flow chart illustrating a queuing process by the header reference unit 410 of the bandwidth controllers 3300 to 3302. The internal structure of each of the bandwidth controllers 3300 to 3302 is the same as that illustrated in FIG. 2.

Upon reception of a packet with the control information header 3400 from a corresponding one of the packet processors 3100 to 3101, the header reference unit 410 judges whether the QoS reference mode of the bandwidth controller is packet header reference (Step 4010). If the mode is packet header reference, the queuing process A (Step 2000) in FIG. 7 is executed (Step 4020). If the mode is not packet header reference, the control information header 3400 is referred to to set the user information (control information) 3410 as the user information and the queue information (control information) 3420 as the control information (Step 4030). The packet is queued in the queue identified by the obtained user information and queue information (Step 4040).

According to this embodiment, selecting one of the search result of the QoS information management table and the packet header information to determine the user information and queue information for identifying a queue in which a received packet is queued, can be performed in the apparatus unit basis so that the structure of the apparatus can be changed flexibly, matching the network requirements.

Figures 13, 14:
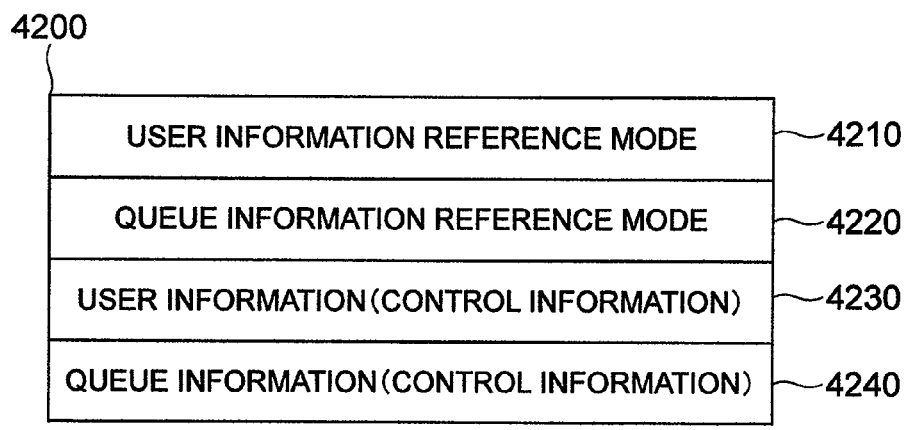
FIG. 13 is a diagram illustrating another example of the structure of the QoS information management table.
FIG. 14 is a diagram illustrating the detailed format of the control information header.

Still another embodiment of the present invention will be described. In this embodiment, although the structure of the packet relay apparatus is the same as that of the packet relay apparatus 3010 shown in FIG. 8, data management by the QoS information management table 3160 illustrated in FIG. 9 is different as illustrated in FIG. 13. A QoS information management table 4100 is constituted of: a packet detection condition 4110 for detecting a packet; a user information reference mode 4120 of determining which of the packet header information and the search result by the QoS search unit 3150 is referred to as the user information; a queue information reference mode 4130 of determining which of the packet header information and the search result by the QoS search unit 3150 is referred to as the queue information; and a condition for instructing to queue the packet coincident with the packet detection condition into the packet identified by the use information 4140 and queue information 4150. In this embodiment, the user information reference mode 4120, queue information reference mode 4130, user information 4140 and queue information 4150 are called collectively QoS information.

As illustrated in FIG. 14, a user information reference mode 4210, a queue information reference mode 4220, user information (control information) 4230 and queue information (control information) 4240 which are the search results by the QoS search unit 3150 are stored in the control information header for transferring QoS information between the packet processors 3100 to 3101 and the network interfaces 3200 to 3202.

Figure 15:
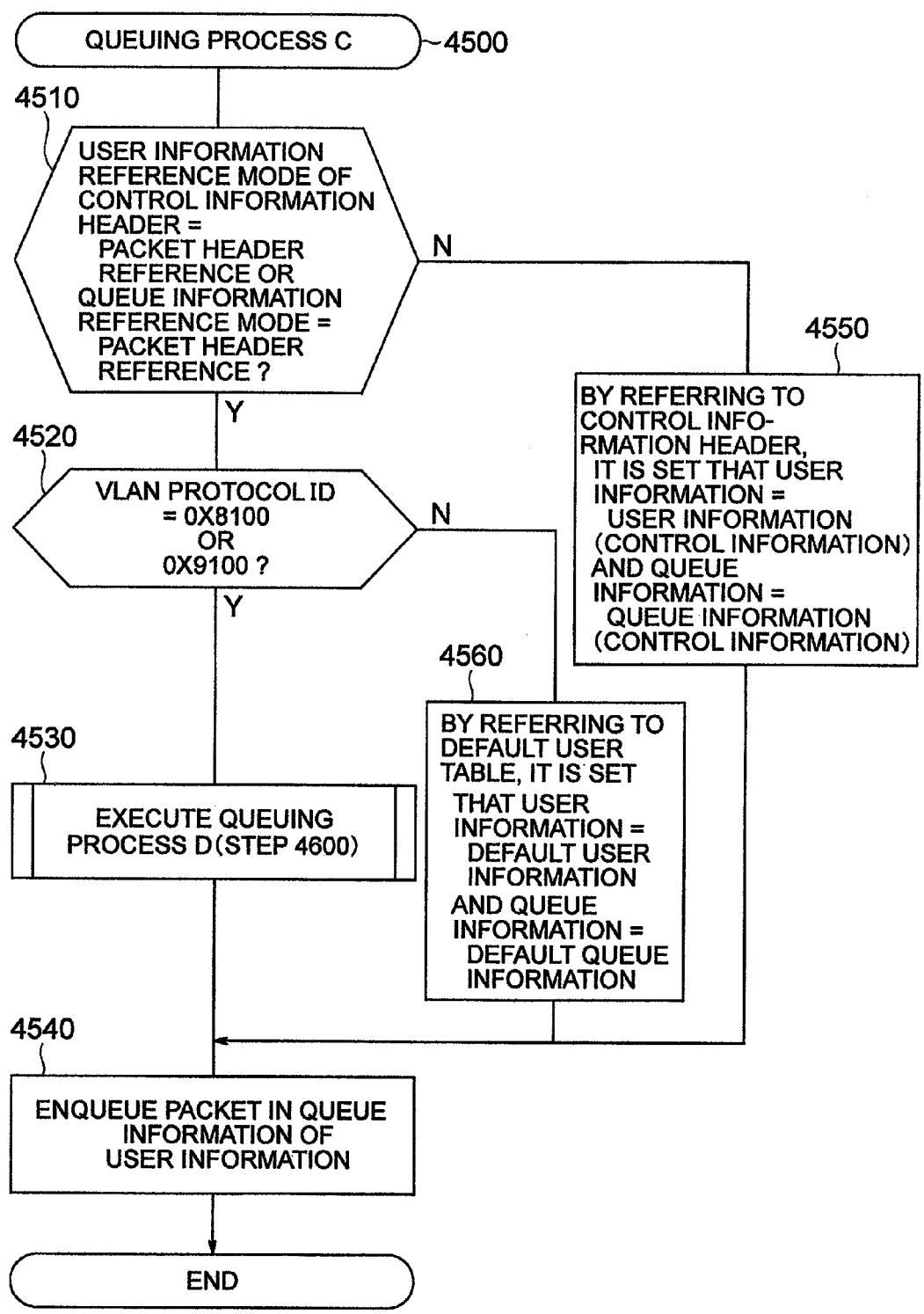
FIG. 15 is a flow chart illustrating a queuing process C by the header reference unit.
Figure 16:
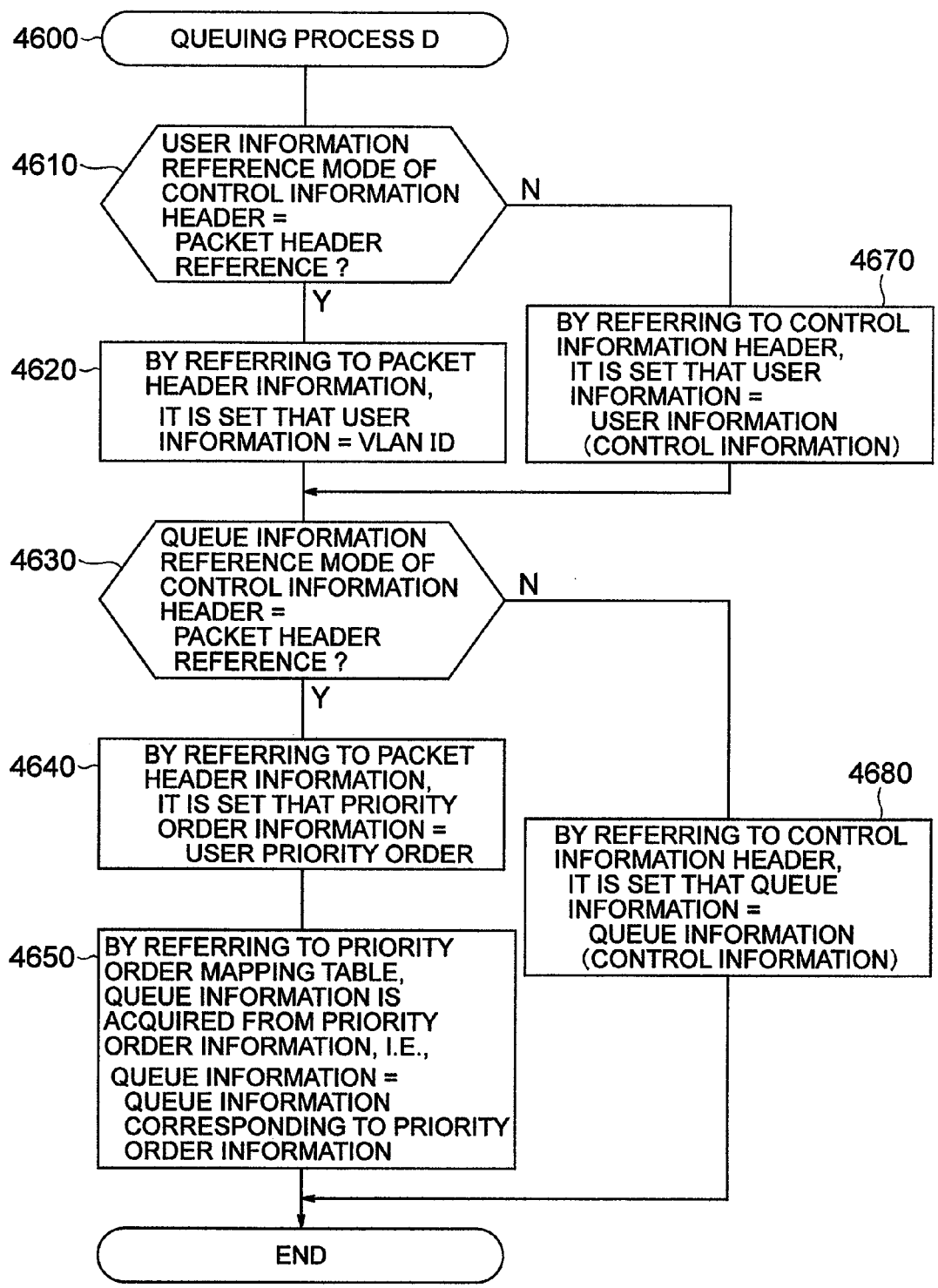
FIG. 16 is a flow chart illustrating a queuing process D by the header reference unit.

FIGS. 15 and 16 are an example of a flow chart illustrating a queuing process by the header reference unit of this embodiment.

Upon reception of a packet with a control information header 4200 from a corresponding one of the packet processors 3100 to 3101, the header reference unit 410 judges whether one or both of the user information reference mode 4210 and queue information reference mode 4220 of the control information header 4200 indicate a packet header reference mode (Step 4510). If neither the user information reference mode 4210 nor the queue information reference mode 4220 indicates a header reference mode (N at Step 4510), by referring to the control information header 4200, it is set that the user information (control information) 4230 is used as the user information and the queue information (control information) 4240 is used as the queue information (Step 4550). If it is judged at Step 4510 that at least one of the user information reference mode 4210 and the queue information reference mode 4220 indicates a header reference mode (Y at Step 4510), it is judged whether the VLAN protocol ID 1030 of a received Tag-VLAN packet 1000 is coincident with 0x8100 or 0x9100 indicating a Tag-VLAN packet (Step 4520). If not coincident, by referring to the default user table 420, it is set that the default user information 421 is used as the user information and the default queue information 422 is used as the queue information (Step 4560). If it is judged coincident Step 4520, a queuing process D (Step 4600) to be described later is executed (Step 4530). A packet is ultimately queued in the queue identified by the obtained user information and queue information (Step 4540).

In the queuing process D (Step 4600) illustrated in FIG. 16, it is judged whether the user information reference mode 4210 of the control information header 4200 indicates a packet header reference mode (Step 4610). If the mode does not indicate the packet header reference mode, the user information (control information) 4230 is used as the user information (Step 4670). If it is judged at Step 4610 that the mode indicates the packet reference mode, the VLAN ID 1043 in the packet header is used as the user information (Step 4620). It is judged next whether the queue information reference mode 4220 in the control information header 4200 indicates the packet header reference mode (Step 4630). If the mode does not indicate the packet header reference mode, the queue information (control information) 4240 is used as the priority order information (Step 4680). If it is judged at Step 4630 that the mode indicates the packet header reference mode, the user priority order 1041 in the packet header is used as the priority order information (Step 4640). The priority mapping table 430 is referred to by using the priority order information as a search key to acquire the queue information 432 corresponding to the priority order information 431 (Step 4650).

According to this embodiment, a queuing method can be changed with each packet. For example, a packet transmitted from an organization having a QoS policy definitely determining a priority order of, e.g., an application type is processed by referring to the priority order information in the packet header. A packet transmitted from an organization having no QoS policy is processed by using the QoS search unit. If there is the QoS policy, the apparatus can be set easily. The number of entries used in the QoS information management table can be suppressed.

The command analysis/setting process program 50 described with reference to FIG. 20 allocates the same bandwidth control information of the hierarchical shaper function to all users. Special users capable of being set individually may be expanded as a parameter like the setting command illustrated in FIG. 21. With this command, requirements such as allocating a wider bandwidth to a special user can be satisfied. This setting command is constituted of: a command name "shaper" 5200 of the hierarchical shaper function; a sub-command name "auto-configuration" 5210; a parameter"<scenario name>" 5220 to be used for selecting a scenario of bandwidth control information; a parameter "<user count>" 5230 to be used for setting the number of users per port; and a parameter "<special user count>" 5240 for setting the number of special users per port. A command to be set individually for each special user is constituted of a command name "shaper user" 5300-5310, a special user name "special user 1" 5320, and setting information "setting information" 5330 of the hierarchical shaper function.

With this setting, it becomes possible to perform bandwidth control in accordance with the scenario designated by the "<scenario name>" 5220 for users (also called "ordinary users") other than the special users, and in accordance with the "setting information" 5330 individually set for each special user. For example, a bandwidth left after the special users are given some bandwidth from a line bandwidth may be distributed to ordinary users. In this case, only a scheduling method 5060 of each scenario illustrated in FIG. 19 is set beforehand, a minimum bandwidth of each ordinary user is set to a bandwidth left after the special users are given some bandwidth from a line bandwidth, and the minimum bandwidth of each ordinary user is set to a bandwidth obtained by dividing the maximum bandwidth by the number of ordinary users. The packet relay apparatus can use mixedly ordinary users to which the same bandwidth control policy is applied uniformly and special users to which a bandwidth and the like different from those of the ordinary users are assigned individually. Such bandwidth settings can be defined arbitrarily by the command analysis/setting process program 50.

Figures 17, 18:
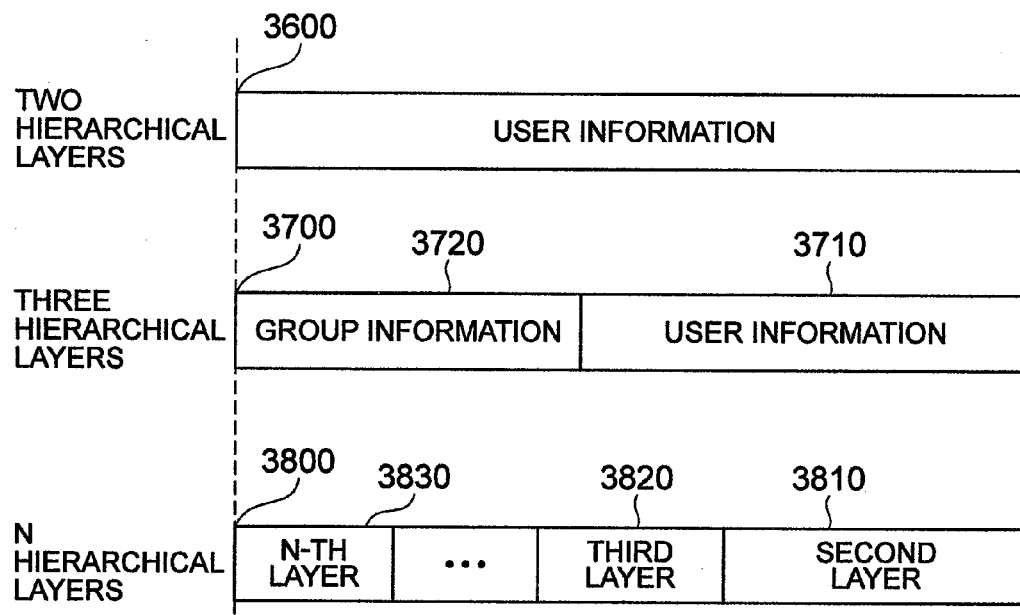
FIG. 17 is a diagram illustrating an example of a correspondence among a protocol type, user information and priority order information.
FIG. 18 is a diagram illustrating an example of a correspondence among fields corresponding to user information and multi stage hierarchical levels.

In the embodiments described above, a correspondence between the user information and priority order information has been described for the packet type of Tag-VLAN. The present invention is not limited to Tag-VLAN, but it is also applicable as illustrated in FIG. 17 to Internet Protocol version 4 (IPv4) 3540, Internet Protocol version 6 (IPv6) 3550, 3560 and Multi Protocol Label Switching (MPLS) 3570.

A method of applying the present invention has been described for the hierarchical shaper function of two hierarchical layers. The present invention is also applicable to the case wherein the number of hierarchical layers to be subjected to bandwidth control is increased by logically dividing user information into three hierarchical layer 3700 or N hierarchical layers 3800 as illustrated in FIG. 18.

For example, for bandwidth control of three hierarchical layers, group information 3720 is stored in the first half of a user information field (VLAN ID 1043 for Tag-VLAN) of the packet header information, and user information 3710 is stored in the second half, each of the first and second halves being used as the user information of each queuing process illustrated in FIGS. 7, 12, 15 and 16. In the buffer 310, queues are provided for each combination of the group information 3720 and user information 3710, and a packet is queued in the queue identified by the group information 3720, user information 3710 and queue information. It is assumed that 12 bits of the VLAN ID 1043 is halved to store the group information 3720 in the first half of 6 bits and store the user information 3710 in the second half of 6 bits. If the group information 3720 is "3" ("000011" in binary), the user information 3710 is "2" ("000010" in binary), and the queue information is "1" ("001" in binary), then a combined number of these binary bits "000011 000010 001" is 1553 (in decimal). This number is used as a queue number of a queue into which a packet is queued. In the number of hierarchical layers to be subjected to bandwidth control is N (N is an integer), the user information field of the packet header information is divided by (N−1), and each divided field is used for storing individual user information. The transmission controller allocates first a bandwidth to each user in the N-th hierarchical layer, sequentially allocates a bandwidth narrower than that of the N-th hierarchical layer, to each user in the (N−1)-th hierarchical layer, and finally allocates a bandwidth to each user in the second hierarchical layer. A packet is read from the corresponding queue while ensuring the finally allocated bandwidth to the second hierarchical layer. In this manner, the packet can be queued, independently from the number of hierarchical layers to be subjected to bandwidth control.

The present invention has been described above specifically in conjunction with the embodiments. The present invention is not limited to the embodiments, but it is clearly notified that various modifications are possible without departing from the gist of the present invention.

The invention claimed is:

1. A packet relay apparatus to be connected to a plurality of networks each accommodating users, comprising:
a plurality of network interfaces having bandwidth controllers for transmission/reception of a packet relative to said networks; and
a packet processor for referring to header information of said packet received via any one of said plurality of network interfaces to determine a relay destination, and transferring said packet to any one of said plurality of network interfaces,
wherein said bandwidth controller comprises:
a buffer having a plurality of queues;
a queuing unit for storing said packet in any one of said plurality of queues; and
a transmission controller for transmitting said packet stored in said queue in accordance with bandwidth information,
a QoS information management unit for storing a packet detection condition, said user information representative of users from and at which said packet is transmitted and received, and said priority order information representative of a priority order of said packet, respectively in correspondence with each other;
a QoS search unit for referring to said QoS information management unit to acquire said user information and said priority order information stored in correspondence with said packet detection condition coincident with said header information of said packet; and
a relay processor for affixing a control information header including said user information and said priority order information acquired by said QoS search unit to said packet and transferring said packet to said network interface, and
said queuing unit performs either one of a first process of referring to a first field of header information of said packet to judge whether said packet is a predetermined packet type, if said packet is the predetermined packet type, referring to a second field of said header information to acquire user information representative of users from and at which said packet is transmitted and received, referring to a third field of said header information to acquire priority order information representative of a priority order of said packet, and determining a storage destination of said packet among said plurality of queues in accordance with said acquired user information and priority order information or a second process of determining a storage destination of said packet among said plurality of queues in accordance with said user information and said priority order information included in said control information header.

2. The packet relay apparatus according to claim 1, further comprising
a bandwidth setting unit for setting said bandwidth information to said bandwidth controller, wherein:
said bandwidth information includes at least one of a minimum bandwidth of each of said users, a maximum bandwidth of each of said users and a line bandwidth; and
said bandwidth setting unit sets said bandwidth controller to uniformly assign the same bandwidth information to said users.

3. The packet relay apparatus according to claim 2, wherein said minimum bandwidth is a bandwidth obtained by dividing said line bandwidth by the number of said users.

4. The packet relay apparatus according to claim 1, further comprising
a bandwidth setting unit for setting said bandwidth information to said bandwidth controller, wherein:
said bandwidth information includes at least one of a minimum bandwidth of each of said users, a maximum bandwidth of each of said users and a line bandwidth; and
said bandwidth setting unit sets said bandwidth controller to assign a designated bandwidth to special users and assign a bandwidth obtained by dividing a left line bandwidth by the number of ordinary users to said ordinary users as said minimum bandwidth.

5. The packet relay apparatus according to claim 1, wherein said predetermined packet type is one of Tag-VLAN, IPv4, IPv6 and MPLS.

6. A packet relay apparatus to be connected to a plurality of networks each accommodating users, comprising:
a plurality of network interfaces having bandwidth controllers for transmission/reception of a packet relative to said networks; and
a packet processor for referring to header information of said packet received via any one of said plurality of network interfaces to determine a relay destination, and transferring said packet to any one of said plurality of network interfaces,
wherein said bandwidth controller comprises:
a buffer having a plurality of queues;
a queuing unit for storing said packet in any one of said plurality of queues; and
a transmission controller for transmitting said packet stored in said queue in accordance with bandwidth information,
said packet processor comprises:
a QoS information management unit for storing a packet detection condition, user information representative of users from and at which said packet is transmitted and received, priority order information representative of a priority order of said packet, first information representative of whether said user information is acquired by referring to said header information of said packet, and second information representative of whether said priority order information is acquired by referring to said header information of said packet, respectively in correspondence with each other;
a QoS search unit for referring to said QoS information management unit to acquire said user information, said priority order information, said first information and said second information stored in correspondence with said packet detection condition coincident with said header information of said packet; and
a relay processor for affixing a control information header including said user information, said priority order information, said first information and said second information acquired by said QoS search unit to said packet and transferring said packet to said network interface,
and if at least one of said first information and said second information is information indicating reference to said header information of said packet, said queuing unit refers to a first field of said packet header information to judge whether said packet is a predetermined packet type, if said packet is the predetermined packet type, acquires said user information from said header information or said control information header of said packet, in accordance with said first information, acquires said priority order information from said header information or said control information header of said packet, in accordance with said second information, and determines a storage destination of said packet among said plurality of queues in accordance with said acquired user information and said acquired priority order information.

* * * * *